(12) United States Patent
Watkins (10) Patent No.: US 7,571,464 B2
(45) Date of Patent: Aug. 4, 2009

(54) SECURE BIDIRECTIONAL CROSS-SYSTEM COMMUNICATIONS FRAMEWORK

(75) Inventor: Ryan Edward Watkins, Chandler, AZ (US)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 10/927,723

(22) Filed: Aug. 27, 2004

(65) Prior Publication Data

US 2006/0048217 A1    Mar. 2, 2006

(51) Int. Cl.
*G06F 7/04* (2006.01)
*G06F 17/30* (2006.01)
*H04L 9/32* (2006.01)

(52) U.S. Cl. ................... 726/3; 726/6; 726/11; 719/314
(58) Field of Classification Search ..................... 726/3, 726/6, 11; 719/314
See application file for complete search history.

(56) References Cited

U.S. PATENT DOCUMENTS

| | | | | |
|---|---|---|---|---|
| 5,613,070 A * | 3/1997 | Born | ........................... | 709/253 |
| 5,781,551 A * | 7/1998 | Born | ........................... | 370/408 |
| 5,875,329 A * | 2/1999 | Shan | ........................... | 719/314 |
| 5,881,315 A * | 3/1999 | Cohen | ........................... | 710/52 |
| 5,887,168 A * | 3/1999 | Bahls et al. | ................. | 719/314 |
| 6,023,722 A * | 2/2000 | Colyer | ....................... | 709/201 |
| 6,292,825 B1 * | 9/2001 | Chang et al. | ................ | 709/206 |
| 6,351,761 B1 * | 2/2002 | Cantone et al. | ............ | 709/202 |
| 6,671,728 B1 * | 12/2003 | Mayberry | ................... | 709/227 |
| 6,845,230 B2 * | 1/2005 | Syed | ........................... | 455/3.02 |
| 6,874,088 B1 * | 3/2005 | Stevens | ......................... | 726/6 |
| 6,941,355 B1 * | 9/2005 | Donaghey et al. | ........... | 709/220 |
| 6,952,731 B2 * | 10/2005 | Picca et al. | ................. | 709/225 |
| 6,968,556 B1 * | 11/2005 | Caron et al. | ................ | 719/318 |
| 7,089,564 B2 * | 8/2006 | Chen et al. | .................. | 719/314 |
| 7,130,896 B2 * | 10/2006 | Engel et al. | ................. | 709/220 |
| 7,152,232 B2 * | 12/2006 | Chaudhry et al. | ........... | 719/314 |
| 7,181,493 B2 * | 2/2007 | English et al. | .............. | 709/204 |
| 7,192,235 B2 * | 3/2007 | Blight et al. | ............. | 455/412.1 |
| 7,216,142 B2 * | 5/2007 | Whipple et al. | ............. | 709/203 |
| 7,219,157 B2 * | 5/2007 | Blott et al. | .................. | 709/238 |
| 7,237,037 B2 * | 6/2007 | Wells et al. | ................. | 709/246 |
| 7,333,974 B2 * | 2/2008 | Patterson | ....................... | 707/3 |
| 7,334,019 B2 * | 2/2008 | Quick et al. | ................ | 709/206 |
| 7,340,731 B2 * | 3/2008 | Laura | .......................... | 717/149 |
| 7,388,839 B2 * | 6/2008 | Chafle et al. | ................ | 370/236 |
| 2001/0037354 A1 * | 11/2001 | Brinkmeyer | ................ | 709/102 |

(Continued)

*Primary Examiner*—David García Cervetti
(74) *Attorney, Agent, or Firm*—James R. Nock (57) ABSTRACT

A local computer system and a remote computer system are connected by a network. When the local computer system needs to initiate communication with the remote computer system or vice versa, a cross-system request is generated, and placed in a request queue on the computer system generating the request. All cross-system requests residing on request queues and are handled by two jobs executing on local computer system. The first of these jobs, a request push job, pushes cross-system requests existing on local computer system's request queue to the remote computer system's request queue. The second of these jobs, a request pull job, pulls cross-system requests existing on remote computer system's request queue over to local computer system's request queue. In this way, all cross-system communications are initiated from a computer system inside the firewall (e.g., local computer system) without violating any outside-in dataflow limitations.

11 Claims, 9 Drawing Sheets

U.S. PATENT DOCUMENTS

| | | | |
|---|---|---|---|
| 2002/0026499 A1* | 2/2002 | Cantone et al. | 709/219 |
| 2002/0038340 A1* | 3/2002 | Whipple et al. | 709/203 |
| 2002/0078186 A1* | 6/2002 | Engel et al. | 709/220 |
| 2002/0124117 A1* | 9/2002 | Beukema et al. | 709/314 |
| 2002/0144006 A1* | 10/2002 | Cranston et al. | 709/312 |
| 2002/0199007 A1* | 12/2002 | Clayton et al. | 709/230 |
| 2003/0037102 A1* | 2/2003 | Eckert et al. | 709/203 |
| 2003/0037122 A1* | 2/2003 | Picca et al. | 709/219 |
| 2003/0043073 A1* | 3/2003 | Gray et al. | 342/465 |
| 2003/0065725 A1* | 4/2003 | Delmer et al. | 709/206 |
| 2003/0065726 A1* | 4/2003 | Wells et al. | 709/206 |
| 2003/0065949 A1* | 4/2003 | Le et al. | 713/201 |
| 2003/0069831 A1* | 4/2003 | Le et al. | 705/37 |
| 2003/0069980 A1* | 4/2003 | Picca et al. | 709/227 |
| 2003/0079121 A1* | 4/2003 | Gilman et al. | 713/153 |
| 2003/0083045 A1* | 5/2003 | Blight et al. | 455/412 |
| 2003/0084108 A1* | 5/2003 | Syed | 709/206 |
| 2003/0092376 A1* | 5/2003 | Syed | 455/3.06 |
| 2003/0110131 A1* | 6/2003 | Alain et al. | 705/51 |
| 2003/0115347 A1* | 6/2003 | Wolrich et al. | 709/230 |
| 2003/0135556 A1* | 7/2003 | Holdsworth | 709/206 |
| 2003/0158960 A1* | 8/2003 | Engberg | 709/237 |
| 2003/0163552 A1* | 8/2003 | Savitzky et al. | 709/219 |
| 2003/0163600 A1* | 8/2003 | Lankinen et al. | 709/318 |
| 2003/0172304 A1* | 9/2003 | Henry et al. | 713/201 |
| 2003/0182261 A1* | 9/2003 | Patterson | 707/1 |
| 2003/0229900 A1* | 12/2003 | Reisman | 725/87 |
| 2004/0015505 A1* | 1/2004 | Quick et al. | 707/100 |
| 2004/0019678 A1* | 1/2004 | St. Pierre et al. | 709/225 |
| 2004/0024641 A1* | 2/2004 | Cartwright | 705/14 |
| 2004/0031058 A1* | 2/2004 | Reisman | 725/112 |
| 2004/0064325 A1* | 4/2004 | Syed et al. | 704/500 |
| 2004/0088403 A1* | 5/2004 | Aggarwal | 709/224 |
| 2004/0152446 A1* | 8/2004 | Saunders et al. | 455/411 |
| 2004/0243617 A1* | 12/2004 | Bayyapu | 707/102 |
| 2004/0252711 A1* | 12/2004 | Romano et al. | 370/412 |
| 2004/0254993 A1* | 12/2004 | Mamas | 709/206 |
| 2004/0255335 A1* | 12/2004 | Fickle et al. | 725/135 |
| 2005/0053018 A1* | 3/2005 | Hoppe-Boeken et al. | 370/260 |
| 2005/0216555 A1* | 9/2005 | English et al. | 709/204 |
| 2005/0288044 A1* | 12/2005 | Atkins et al. | 455/466 |
| 2006/0048217 A1* | 3/2006 | Watkins | 726/11 |
| 2006/0074876 A1* | 4/2006 | Kakivaya et al. | 707/3 |
| 2006/0233180 A1* | 10/2006 | Serghi et al. | 370/401 |
| 2008/0034051 A1* | 2/2008 | Wallis et al. | 709/207 |

* cited by examiner

SECURE BIDIRECTIONAL CROSS-SYSTEM COMMUNICATIONS FRAMEWORK

BACKGROUND OF THE INVENTION

1. Field of the Invention

The current invention generally relates to network security. More specifically, the current invention relates network data transmissions through a firewall.

2. Description of the Related Art

As computer networks have evolved, increasingly sensitive personal and business data have been stored on information systems to improve efficiency and reduce the cost of doing business. Consequently, this valuable personal data has become a target for computer theft and a rise in attacks on information systems has been observed. Moreover, storing sensitive personal data on information systems has given system administrators the enormous responsibility of ensuring data security and data integrity. Indeed, information system security is a high priority for system administrators handling sensitive data.

System administrators currently have a number of tools at their disposal to ensure data security and data integrity. Secure Shell (SSH) software may be used to prevent plaintext transmissions from being intercepted by computer criminals by creating an encrypted tunnel through which information flows that only the intended receiver and sender can interpret. SSH was designed as a replacement for previously existing remote administration tools such as rsh and telnet. Tools such as rsh, telnet, and ssh give a system administrator the ability to issue commands on a computer system from a remote location. SSH achieves a high level of security by creating a secured logical tunnel. A client, for example, that wishes to communicate with a server running an SSH service initiates a connection with that server. The server sends back a public host key to the client identifying the server, which is then used to create an encrypted session key by the client. The client proceeds to send the session key back to the server, and the server decrypts this session key and creates an encrypted connection between the client and server. Authentication is then required using a password or other means to log into the server over the encrypted connection. While this method offers a high level of security, the process is not transparent in environments where a persistent connection is required. Furthermore, SSH has generally been limited to gaining remote access to a shell (command line interface to a computer system) rather than for application programming.

Secure Socket Layer (SSL) technology provides similar functionality for transmissions which take place over networks employing the Hypertext Transfer Protocol (HTTP). SSL was a response to the increase in online shopping, banking, and identity sensitive activities performed on the web using an Internet web browser. SSL's intended implementation was for HTTP, but SSL's use has been expanded beyond HTTP to other network applications. In an SSL-enabled connection, the user visits an SSL-enabled website. The user's web browser checks the website's identification certificate to ensure the website is legitimate and not another website acting as the intended website. The website has an identification certificate which is obtained from an issuer that both the website itself and the web browser trust. If the certificate is not available or its authenticity appears to be in question, the user's web browser will notify the user and permit the user to make a decision to proceed. The web browser and the website then exchange information indicating what encryption methods are understood on both the web browser and the website in the transaction and an encryption key is generated by the web browser. The encryption key is then sent to the server allowing the website to decrypt transmissions between the web browser and the website. After the key has been sent to the website the connection is secured and all HTTP transmissions from the web browser to the secured website may be encrypted. SSL allows for secure HTTP transmission, but it limited to the HTTP protocol. If another protocol must be secured, SSL support is generally not available or becomes economically unfeasible when trying to adapt the SSL security function to a non-HTTP application.

Recently, Virtual Private Networks (VPN) has been implemented to give users an additional level of security using techniques similar to SSH. A VPN is a security mechanism, which creates a private, encrypted network on a much larger public network infrastructure. The most common VPN implementation is the creation of a private, encrypted network over the Internet. VPN uses a tunneling technique similar to SSH wherein each network packet (discrete network data) is encrypted and transferred between a client and a server. There is no agreed upon specification for VPN implementations, however, and thus the use of the term VPN to describe secure networks can take on various meanings. In general, a VPN requires that a client authenticate with a server, thereby creating an encrypted network, which facilitates the secure transmission of data. The authentication mechanism, encryption algorithm, and network protocol may all be implemented differently, thus leading to innumerable variations. Currently, Point-to-Point Tunneling Protocol and IPSec are competing technologies with different advantages and disadvantages subject to opinions by different professionals. These authentication and encryption mechanisms serve as the basis for the VPN connection. In addition, VPNs use advanced packet-monitoring techniques coupled with encryption to ensure that packets are not intercepted and unreadable and in this respect is generally superior to SSH. VPN however has numerous drawbacks. As previously mentioned, VPN does not have a standard industry specification leading to interoperability problems and expensive vendor lock-in situations. VPNs also only currently support Internet Protocol (IP) on a wide scale. Other legacy protocols requiring secure distributed connections are not supported by current VPN solutions. Therefore, many applications using unsupported transmission mechanisms requiring a secure connection may not use VPN to improve security.

In addition to the aforementioned security tools, system administrators have generally implemented firewalls on all vulnerable networks. A firewall is piece of software that resides on a computer system serving as a gateway between a local and remote network. When data is transferred across the network in the form of multiple network packets over a protocol such as TCP/IP, a firewall intercepts each packet and inspects it en route to its destination. After intercepting the packet, the firewall will accept or reject the packet based on predefined rules established by the system administrator. These rules check the type, source, destination, and other pertinent information of the packet. If the packet's properties pass inspection based on the firewall rules, it is routed on to its destination, if it fails, the network packet will be rejected.

In client/server environments, client software resides on a client computer system and server software resides on a server computer system. A significant benefit of client/server environments is that the client software and server software may reside on different computer systems permitting the two computer systems to be in different locations but on the same network. A typical configuration is a data source that resides on a computer system separate from multiple client computer systems. In a client/server transaction, the client may request data from the server, and the server attempts to supply the requested data in the form of network packets. The process may work in reverse as well when the server requests information from the client. Such configurations exist, for example, where a server checks each client to ensure compliance to a set of security standards. Thus, it is imperative that a transparent path exists in both directions to allow the flow of information in a client/server configuration.

A firewall generally will allow packets to flow freely from a local network to a remote network; however, the converse is generally not true since most firewalls are configured to reject all network transmissions originating from a remote network unless the network transmission has been initiated by a computer system residing on the local network. Firewalls, therefore, create specific problems in client/server environments where the flow of information must occur without obstruction and in either direction to avoid data loss. Various techniques have been employed to permit inbound traffic from a remote network through the firewall to the local network. One such method involves permitting inbound traffic from only designated IP addresses chosen by a system administrator. This solution is feasible but only in networks with a smaller number of servers and clients. In a large environment, designating a specific list of IP addresses is undesirable because of number of IP addresses that would have to be specified as well as the effort required to maintain an accurate list. Another technique permits only specific protocols to pass through the firewall. This is problematic, however, because security flaws may still be exploited within the allowed protocol and thus may still require significant maintenance work to effectively implement. Therefore, a need exists for an efficient method and apparatus that permits inbound traffic from a remote network to enter a local network through a firewall while maintaining appropriate security measures.

SUMMARY OF THE INVENTION

The present invention provides a method and apparatus for secure bidirectional cross-system communication. Accordingly, one aspect of the present invention is a secure bidirectional cross-system communication framework comprising one or more local computer systems each having a request queue; one or more remote computer systems each having a request queue; a network coupling the one or more local computer systems and the one or more remote computer systems; a request push job executing on each of the one or more local computer systems for pushing a cross-system request from the one or more local computer systems to a request queue on each of the one or more remote computer systems; and a request pull job executing on each of the one or more local computer systems for pulling a cross-system request from the one or more remote computer systems to the a request queue on each of the one or more local computer systems. In an embodiment, the secure bidirectional cross-system communication framework further comprises a firewall coupling the local computer system to the remote computer to prevent unauthorized access to the local computer.

Another aspect of the invention is a method of secure bidirectional cross-system communication between one or more local computer systems and one or more remote computer system comprising the steps of initiating a request push job on at least one of the one or more local computer systems for pushing a cross-system request from the one or more local computer systems to a request queue on at least one of the one or more remote computer systems and initiating a request pull job on each of the one or more local computer systems for pulling a cross-system request from at least one of the one or more remote computer systems to a request queue on at least one of the local computer systems.

DETAILED DESCRIPTION OF THE PREFERRED EMBODIMENTS

The present invention provides methods and apparatus to create a secure bidirectional cross-system communication framework permitting a local computer system and a remote computer system to communicate across a network. The present invention provides for dynamic, real-time communication between a remote computer system and a local computer system while preserving a desired level of security.

Figure 1:
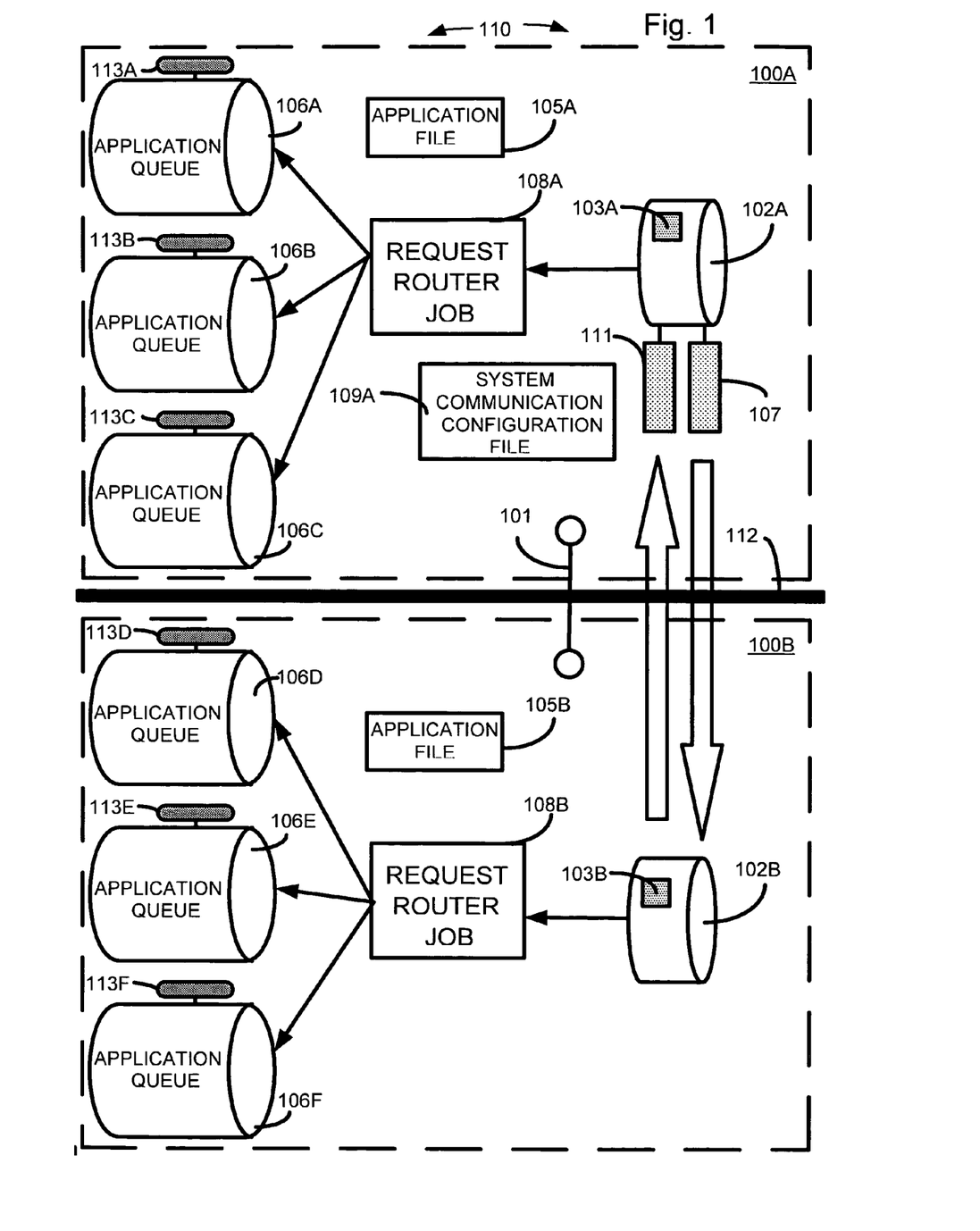
FIG. 1 is a simplified, system view of a secure bidirectional cross-system communication framework.

FIG. 1 is a system view of a secure bidirectional cross-system communication framework, shown generally at 110. A local computer system 100A and a remote computer system 100B are connected by a network 101. In the illustrated embodiment, a firewall 112 exists between local computer system 100A and remote computer system 100B to prevent unauthorized access to local computer system 100A from network traffic originating outside of firewall 112.

When local computer system 100A needs to initiate communication with remote computer system 100B or vice versa, a cross-system request 103A, 103B is generated, and placed in a request queue 102A, 102B on the computer system 100A, 100B generating the request. All cross-system requests 103A, 103B residing on request queues 100A and 100B are handled by two jobs executing on local computer system 100A. The first of these jobs, a request push job 107, pushes cross-system requests 103A existing on local computer system's 100A request queue 102A to the remote computer system's 100B request queue 102B. The second of these jobs, a request pull job 111, pulls cross-system requests 103B existing on remote computer system's 100B request queue 102B over to local computer system's 100A request queue 102A. In this way, all cross-system communications are initiated from a computer system inside the firewall (e.g., local computer system 100A) without violating any outside-in dataflow limitations.

Once a cross-system request 103A, 103B is pushed or pulled between the local computer system 100A and the remote computer system 100B, the target computer system's 100A, 100B request router job 108A, 108B takes the cross-system request 103A, 103B and routes the request to an appropriate application queue 106A-106F. A corresponding application 113A-113F is then responsible for removing the cross-system request 103A, 103B from application queue 106A-106F for processing. A system communication configuration file 109A residing on local computer system 100A contains configuration information required for secure bidirectional cross-system communication framework 110 to properly operate.

Network 101, by example, may be the Internet, an intranet, or any network capable of transmitting information. Furthermore, network 101 may support Transmission Control Protocol (TCP), Internet Protocol (IP), System Network Architecture (SNA), or any network protocol that facilitates the transfer of information. SSL may be used in conjunction with any of the aforementioned protocols. First request queue 102A and second request queue 102B may each temporarily hold one or more cross-system requests 103A, 103B. First request queue 102A and second request queue 102B may be data queues, message queues, or any other queue capable of storing information. Cross-system request 103A, 103B is a software-based notification placed on request queue 102A, 102B by an operating system, or any other computer program, which requires either a local-remote or remote local computer interaction. Cross-system request 103A, 103B may contain the following information about processing that is to be completed including, but not limited to: identification information for processing such as a key, instructions to be executed, and data to be processed and/or stored during the execution of instructions.

Request push job 107 is a continuously running computer process responsible for detecting the presence of a cross-system request 103A on local computer system 100A. The information contained in cross-system request 103A may require one or more applications 113D-F to execute on remote computer system 100B based on information in cross-system request 103A. Request push job 107 places cross-system request 103A on request queue 102B. Request router job 108B then places cross-system request 103A on application data queue 106D-F associated with application 113D-F for which the cross-system request 103A is destined. Each application 113D-F that is associated with cross-system request 103A is responsible for removing and processing cross-system requests 103A assigned to each applications' application data queue 106D-F. Because many applications can be run on a computer system, multiple application data queues 106D-F may be created.

Request pull job 111 is a continuously running computer process responsible for detecting the presence of cross-system request 103B on the remote computer system 100B. Information in cross-system request 103B may require one or more applications 113A-C to execute on local computer system 100A based on information in cross-system request 103B. Request pull job 111 places cross-system request 103B on request queue 102A. Request router job 108A then places cross-system request 103B on application data queue 106A-C associated with the application 113A-C for which cross-system request 103B is destined. Each application 113A-C that is associated with cross-system request 103 is responsible for removing and processing cross-system requests 103B assigned to each applications' application data queue 106A-C. Because many applications can be run on a computer system, multiple application data queues 106A-C may be created.

An application file 105A, 105B resides on both local computer system 100A and remote computer system 100B. Application file 105A, 105B contains a record for each application 113A-F that may be run on a computer system. Furthermore, application file 105A, 105B contains information specifying the relationship between each application 113A-F and its associated application data queue 106A-F. A system communication configuration file 109A resides on local computer system 100A and optionally on remote computer system 100B. System communication configuration file 109A contains information for each computer system 100 regarding which communication protocol to use for cross-system communication, whether or not request push jobs 107 or request pull jobs 111 should be executed, and other settings related to the control of secure bidirectional cross system communication framework 110. System communication configuration file 109A may specify any usable protocol including but not limited to TCP, IP, or SNA. SSL may be used in conjunction with any of the aforementioned protocols.

In an embodiment, a firewall exists on network 101 between local computer system 100A and remote system computer system 100B. Firewalls are well known in the art, and are implemented to prevent network communications from occurring based on a specified set of rules. The firewall implemented in FIG. 1 prevents unauthorized access to local computer system 100A from any remote computer system 100B. In this embodiment, only local computer system 100A may initiate network communication through the firewall between remote computer system 100B and local computer system 100A. Any network communication initiated from remote computer system 100B and not satisfying a predetermined set of firewall rules will be rejected by firewall 112. This configuration prevents unauthorized computer systems also residing on network 101 with remote computer system 100B from gaining access to local computer system 100A. Advantageously, the secure bidirectional cross system communication framework enables network communications to occur in both directions using request data queues 102A, 102B as described above.

In another embodiment, a secure bidirectional cross-system communication framework may be implemented using multiple remote computer systems, multiple local computer systems or a multitude of both remote computer systems and local computer systems. In such configurations, it may be desirable to balance processing workloads among numerous computer systems, or to designate specific applications to specific computer systems. A secure bidirectional cross-system communication framework enables the aforementioned configurations using a Hub/Node environment.

Figure 2:
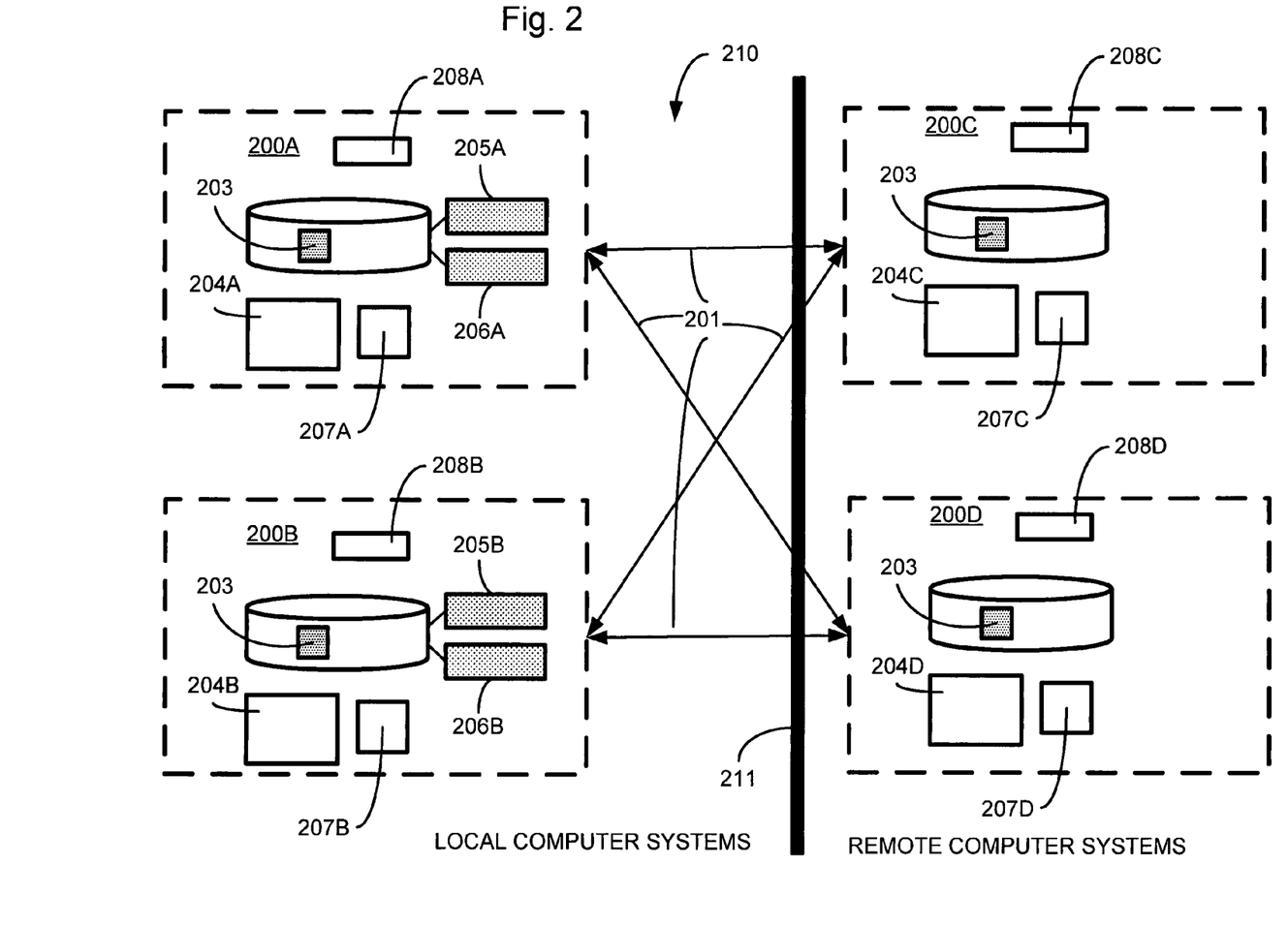
FIG. 2 is a simplified, system view of a secure bidirectional cross-system communication framework using a Hub/Node configuration.

FIG. 2 illustrates an exemplary embodiment illustrating a Hub/Node environment with high availability capability shown generally at 210. More specifically, FIG. 2 illustrates a secure bidirectional cross-system communication framework, simplified to draw attention to pertinent aspects of a Hub/Node environment. In the illustrated embodiment, multiple local computer systems 200A, 200B are coupled to multiple remote computer systems 200C, 200D via a network 201. A firewall 211 exists between multiple local computer systems 200A, 200B and remote computer systems 200C, 200D to prevent unauthorized access to local computer systems 200A, 200B via network 201. A request push job 205A, 205B and a request pull job 206A, 206B execute on each local computer system 200A, 200B to process cross-system requests 203. Local computer systems 200A, 200B will hereafter be referred to as a hub and remote computer system 200C-200D will hereafter be referred to as a node. Application files 208A-208D contain application-specific information. A request re-router job 204A-204D will re-route cross-system requests 203 based upon information contained within hub file 207A-207D. In FIG. 2, a connection exists from each node to hub when each computer system is initialized. The secure bidirectional cross-system communication framework 210 uses a priority-based schema to determine workload levels on each hub. Priority-based schemas are well known in the art and ensure that workload levels are evenly distributed amongst all available computer systems.

In FIG. 2, local computer system 200A will be given a priority status of 1 and local computer system 200B will be given a priority status of 2. In this embodiment, local computer system 200A will be the primary computer system handling cross-system requests 103. In the event that local computer system 200A fails, is shut down for maintenance, or otherwise becomes unavailable, a secondary computer system (i.e., local computer system 200B) will begin processing cross-system requests 203. This priority-based schema is implemented using hub file 207A-207D in conjunction with request re-router job 204A- 204D. Hub file 207A-207D contains information specifying where cross-system requests 203 will be routed, the priority level of each hub and/or node, appropriate response instructions for known or unknown events, and all other information related to directing cross-system request 203 to an appropriate computer system. Request re-router job 204A-204D uses the information contained within hub file 207A-207D to re-route cross-system requests when, for example, local computer system 200A is unavailable. Secure bidirectional cross-system communication framework 210 may be configured to route cross-system requests 203 to all computer systems, the highest priority hub, the highest available hub, or any other hub based on a specified configuration. Advantageously, this priority-based schema results in greater integrity of data and communications in a secure bidirectional cross-system communication framework.

Figure 3:
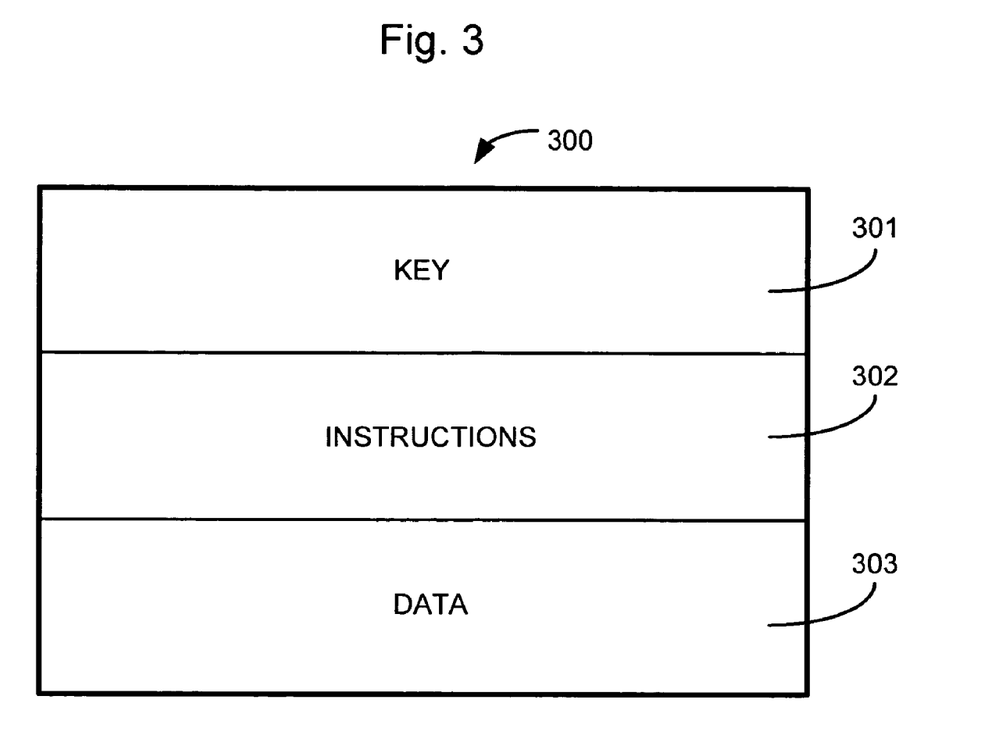
FIG. 3 is a diagram of a cross-system request and its contents.

FIG. 3 is an illustration of a cross-system communication request. In the illustrated embodiment, cross-system request 300 is comprised of three elements: a key 301, instructions 302, and data 303. Cross-system request 300 is a software entity, similar to a software object, and requires at least one of the three elements to be present; however, not all three are required for a functional cross-system request. Further, additional elements may be added to the cross-system communication request without departing from the scope and spirit of the present invention. Instructions 302 will be executed on a computer system to perform some operation, which may use data 303. Key 301 may be used to facilitate more efficient communications in a secure bidirectional cross-system communication framework. For example, if multiple local computer systems and multiple remote computer systems exist, different cross-system requests may be destined for different computer systems, and each different computer system maintains a unique identification. When a cross-system request 300 is placed on a request queue of a remote computer system, for example, key 301 will be assigned a value. When a local computer running a request pull job checks the request queue of the remote computer system, the request pull job will only search for cross-system requests 300 containing a specific key value indicating the intended local computer system to which it is destined. It is well-known in the art that keys may be used to efficiently store and locate objects containing information in various data structures using indexing or other performance enhancing techniques.

Figure 4:
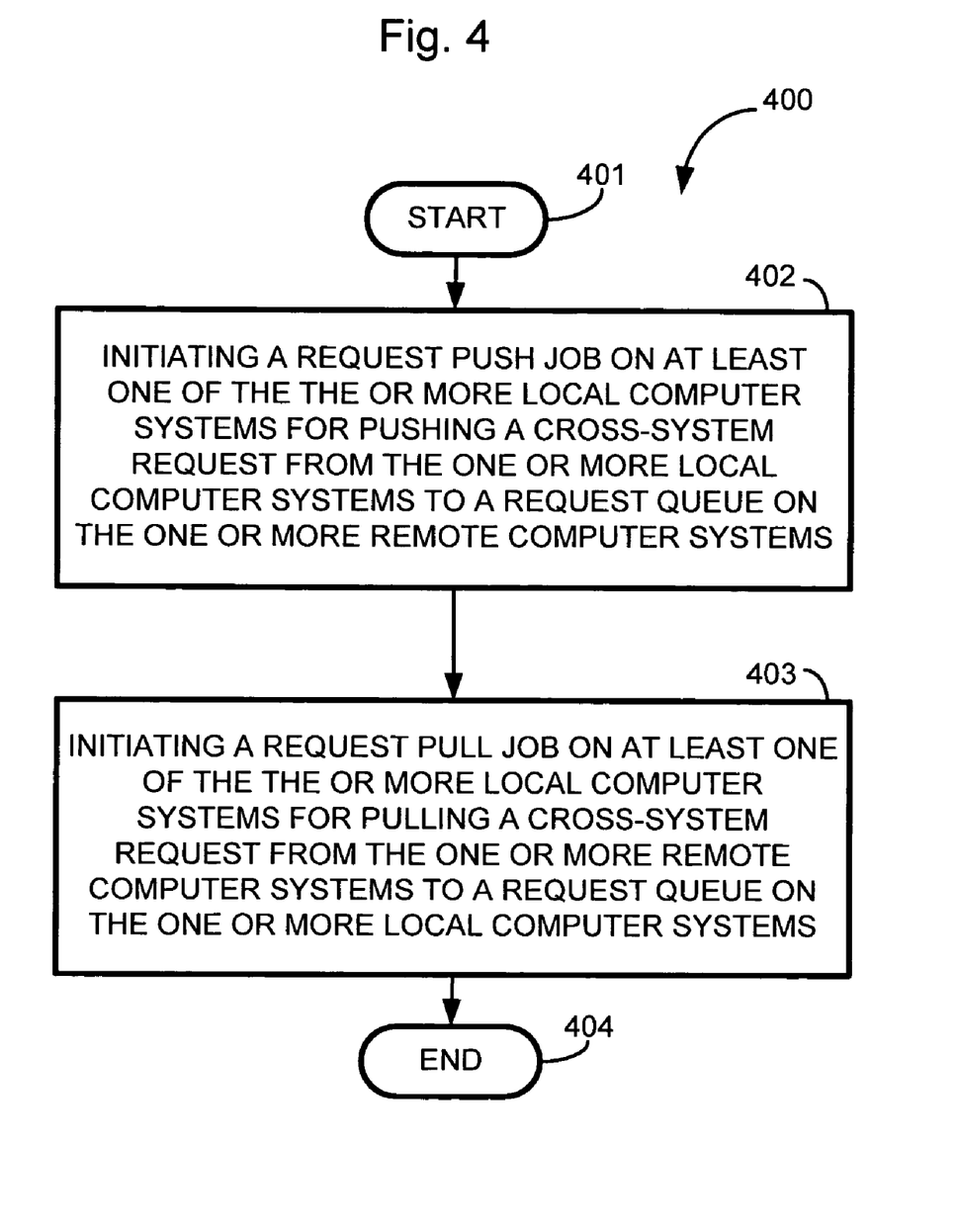
FIG. 4 is a flow chart illustrating a method for providing secure bidirectional cross-system communication between one or more local computer systems and one or more remote computer systems in accordance with the present invention.

FIG. 4 is a method illustrating the operation of a secure bidirectional cross-system framework shown generally at 400. The method begins at element 401. At element 402, a request push job is initiated by at least one of the one or more local computer systems for pushing a cross-system request from the one or more local computer system to a request queue on at least one of the one or more remote computer systems. At element 403, a request pull job is initiated by at least one of the one or more local computer systems for pulling a cross-system request from at least one of the one or more remote computer systems to a request queue on at least one of the one or more local computer systems. The order in which the request push job and the request pull job are initiated may be reversed; therefore, the order in which the request push job and the request pull job are initiated on the local computer system have no effect on the operation of the secure bidirectional cross-system communication framework. Once the two processes have started executing the secure bidirectional cross-system communication framework is operational. The secure bidirectional cross-system communication framework can also operate properly if only a request job or only a request pull job are initiated on a local computer system. At element 404, the method ends.

Figure 5:
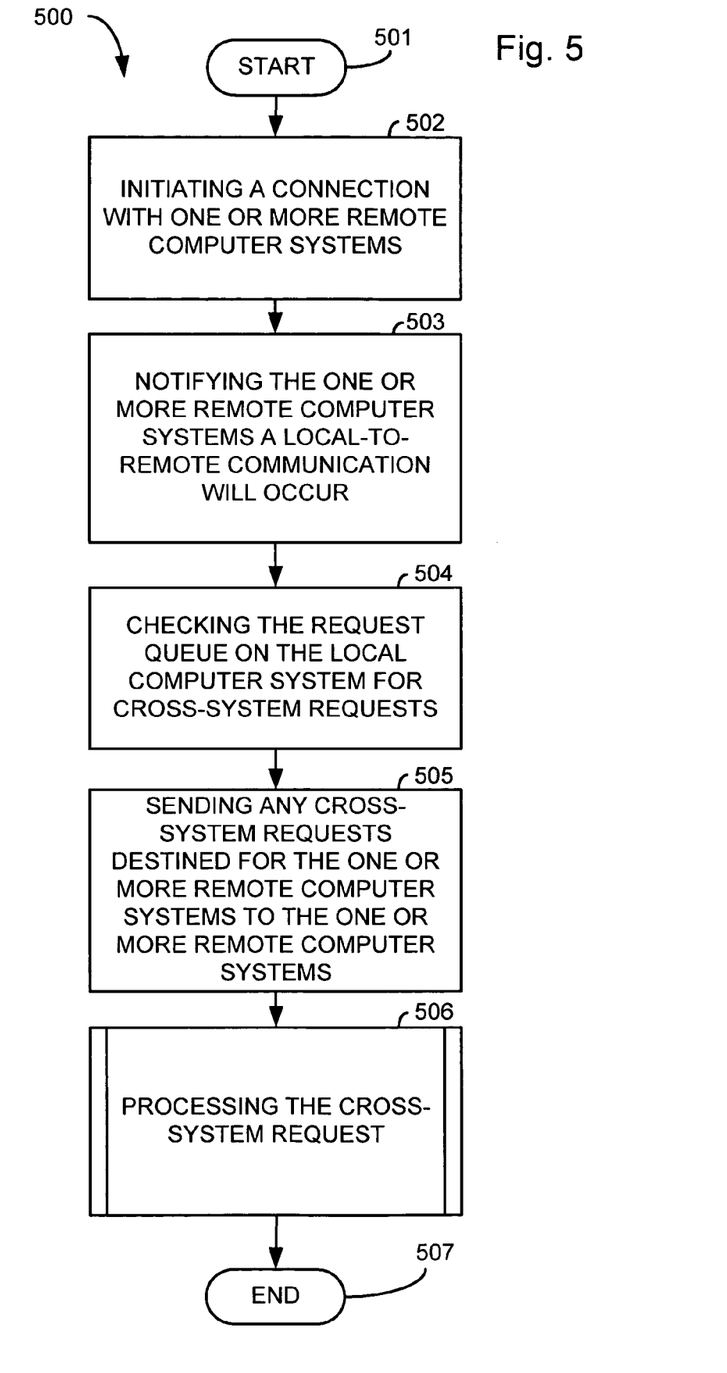
FIG. 5 is a flow chart illustrating a push job executing in a secure bidirectional cross-system communication framework.

FIG. 5 is a flowchart further illustrating a method showing the operation of a request push job, shown generally at 500. The method begins at step 501. At step 502, one or more local computer systems initiate a connection with one or more remote computer systems. In the initiation step, one or more local computer system sends data containing identification, authentication, and other initialization data via a network to one or more remote computer systems. At step 503, one or more local computer systems send one or more remote computer systems data signifying a local-to-remote communication will occur. A local-to-remote communication is a transfer of information using a cross-system request from one or more local computer systems to one or more remote computer systems. At step 504, one or more local computer systems check a request queue on each of the one or more local computer systems for any cross-system requests destined for one or more remote computer systems. At step 505, any cross-system requests are sent to a request queue on one or more remote computer systems. In a step 506, any cross-system requests destined for one or more remote computer systems are processed. This step is further described in FIG. 6. The method ends at step 507.

Figure 6:
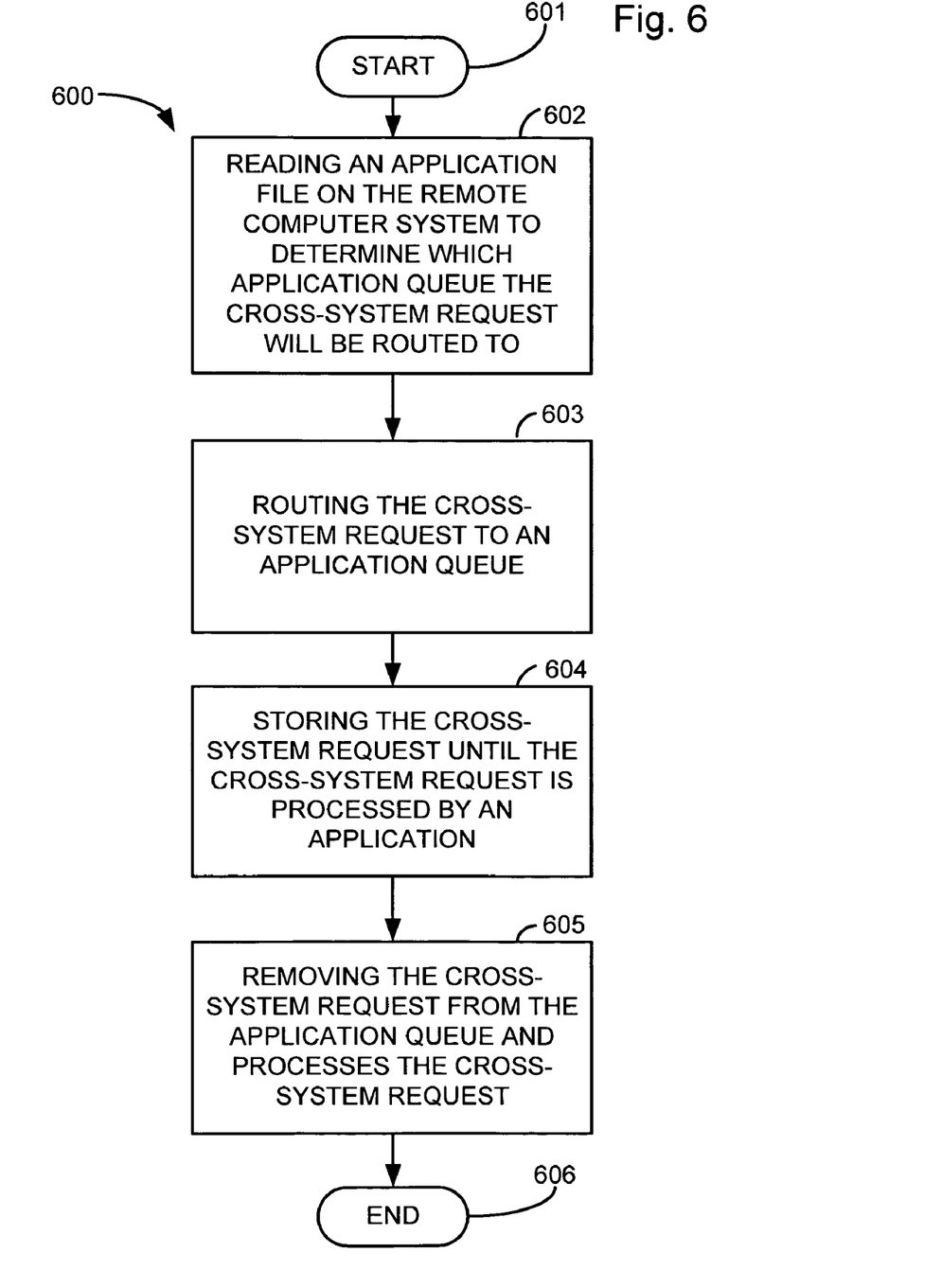
FIG. 6 is a flow chart further illustrating the steps associated with processing the cross-system request previously shown in FIG. 5.

FIG. 6 illustrates the process steps that comprise the "processing the cross-system request" step 506 of FIG. 5, shown generally at 600. The process begins at step 601. In a step 602, a request router job reads an application file to determine which application queue the cross-system request will be routed to. At step 603, the cross-system request is routed to an appropriate application queue as specified by the application file. At step 604, the cross-system request is stored in the appropriate application queue until an application is ready to process it. At step 605, an application removes the cross-system request from the application queue and processes the cross-system request. At block 606, the method ends.

Figure 7:
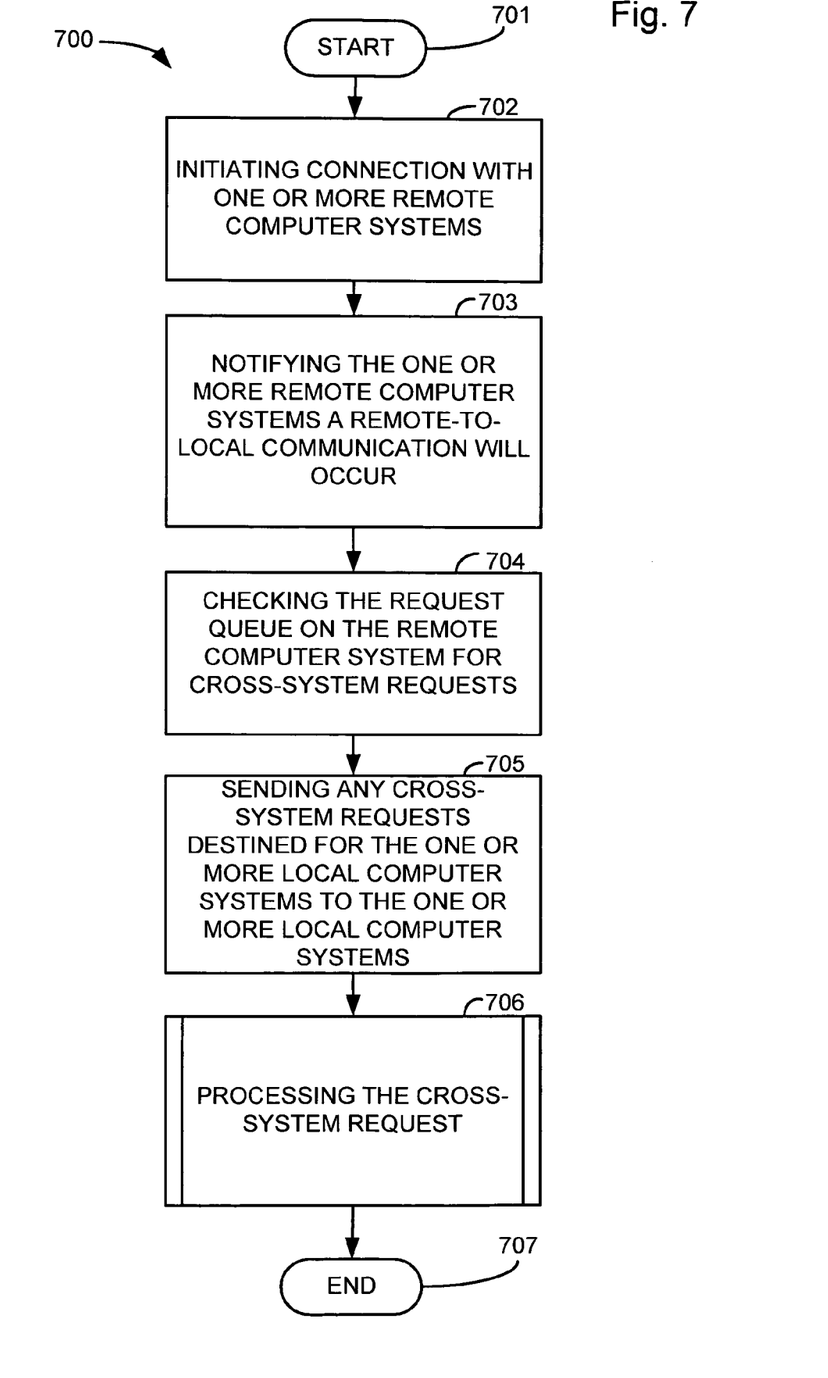
FIG. 7 is a flow chart illustrating a pull job executing in a secure bidirectional cross-system communication framework.

FIG. 7 is a flowchart further illustrating a method showing the operation of a request pull job shown generally at 700. The method begins at step 701. At step 702, one or more local computer systems initiate a connection with one or more remote computer systems. In the initiation step, one or more local computer systems sends data containing identification, authentication, and other initialization data via a network to one or more remote computer systems. The communication originates from the local computer system; therefore, the presence of a firewall does not hinder bidirectional cross-system communication because any network communication originating inside of a firewall may pass through the firewall unobstructed. At step 703, one or more local computer systems send one or more remote computer systems data signifying a remote-to-local communication will occur. A remote-to-local communication is a transfer of information using a cross-system request from one or more remote computer systems to one or more local computer systems. At step 704, one or more local computer systems check a second request queue on each of the one or more remote computer systems for any cross-system requests destined for one or more local computer systems. At step 705, any cross-system requests are sent to a first request queue on one or more local computer systems. The security provided by a firewall in this bidirectional cross-system communication is preserved because the transfer of cross-system requests has been initiated by the local computer system, which permits the cross-system requests to flow through the firewall from the remote computer system to the local computer system. At step 706, any cross-system requests destined for one or more local computer systems are processed. At step 707, the method ends.

Figure 8:
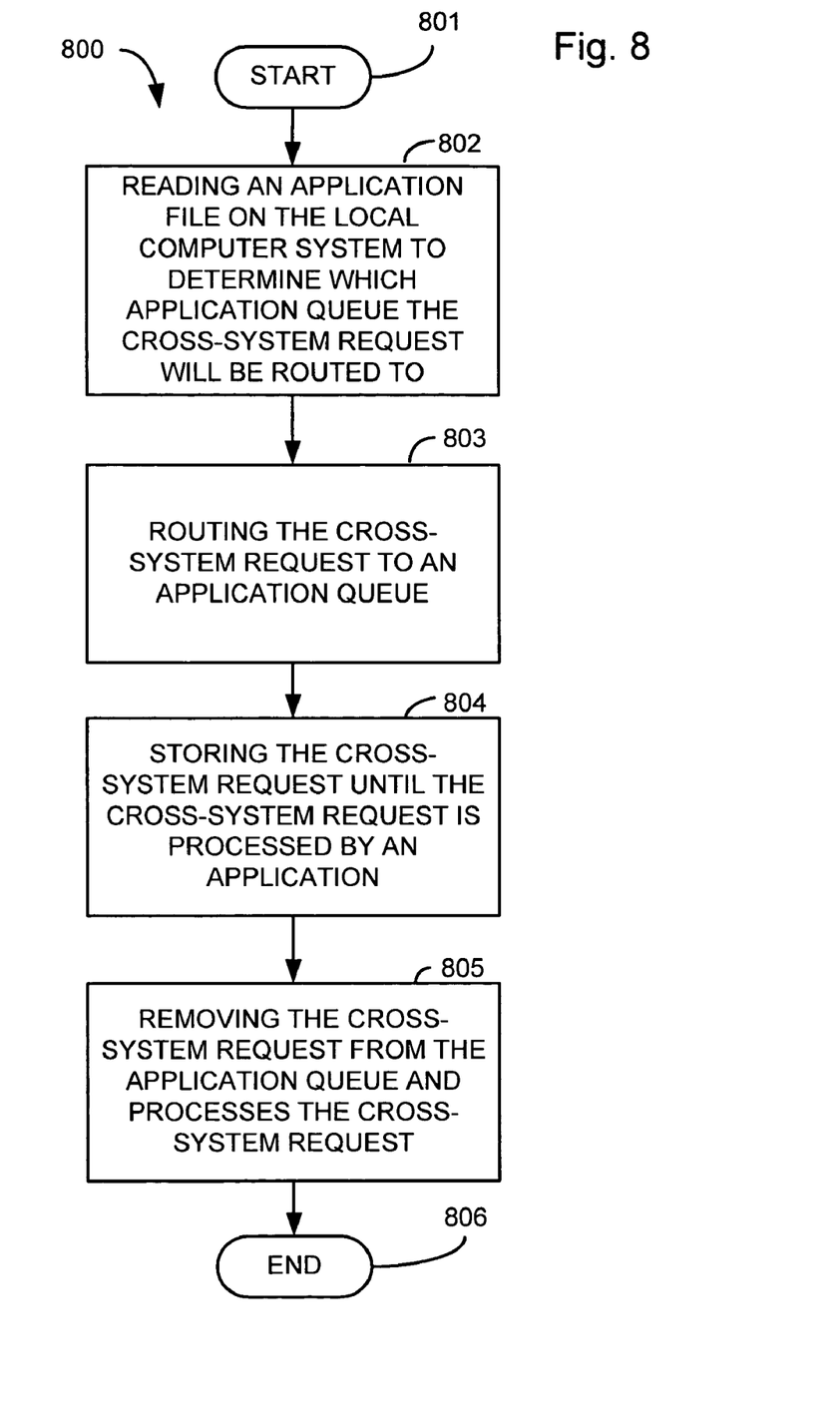
FIG. 8 is a flow chart further illustrating the steps associated with processing the cross-system request previously shown in FIG. 7.

FIG. 8 illustrates the process steps that comprise step 706 of FIG. 7, shown generally at 800. The process begins at step 801. At step 802, a request router job executing on the local computer system reads an application file to determine which application queue the cross-system request will be stored on. At step 803, the cross-system request is routed to an appropriate application queue as specified by the application file. At step 804, the cross-system request is stored in the appropriate application queue until an application is ready to process it. At step 805, an application removes the cross-system request from the application queue and processes the cross-system request. At step 806 the method ends.

Figure 9:
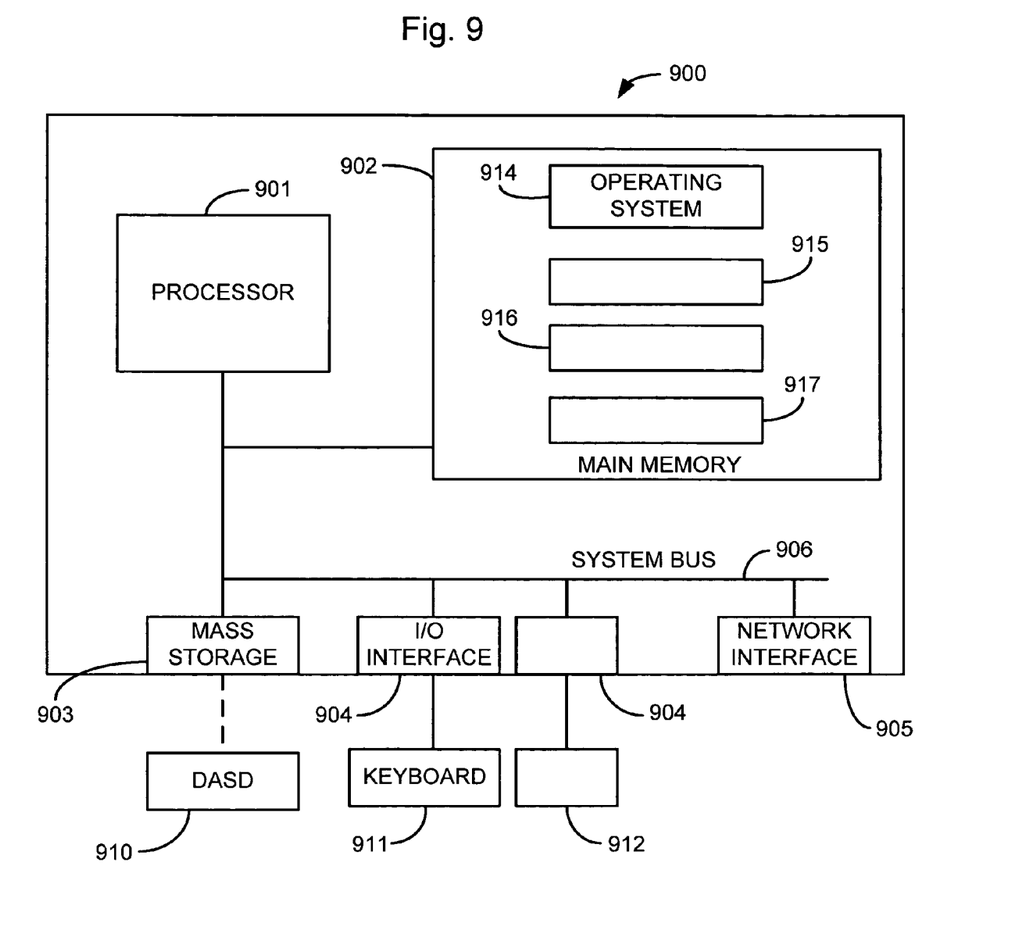
FIG. 9 is a diagram of a computer system and its associated components.

FIG. 9 depicts a computer 900 embodiment suitable for use a local computer system 100A or a remote computer system 100B. This computer 900 embodiment comprises a processor 901 connected to a main memory 902, a mass storage interface 903, one or more I/O interfaces 904, and a network interface 905 via a system bus 906. Mass storage interface 903 connects one or more mass storage devices, such as direct access storage device ("DASD") 901, to system bus 906. The input/output ("I/O") interface 904 connects one or more input/output devices, such as keyboard 911 or cathode ray tube display 912, to system bus 906. Network interface 905 connects the computer 900 to other devices (not shown) over a communication medium (not shown). Main memory 902 contains one or more application programs, such as an operating system 914, an instant messaging client 915, and/or request push and request pull jobs 916, 917.

Processor 901 in this embodiment may be any device capable of executing the program instruction stored in main memory 902; and may be constructed from one or more microprocessors and/or integrated circuits. Furthermore, although computer system 900 is shown to contain only a single processor 901 and a single system bus 906, those skilled in the art will appreciate that the present invention may be practiced using a computer system that has multiple processors 901 and/or multiple buses 906. In addition, the interfaces 903, 904, 905 may each include their own separate, fully programmed microprocessors that are used to off-load compute-intensive processing from processor 901.

When computer 900 starts up, the processor 901 initially executes the program instructions that make up the operating system 914, which is a sophisticated program that manages the resources of computer system 900, including: processor 901; main memory 902; mass storage interface 903; I/O interface 904; network interface 905; and system bus 906. Administrators may enter commands for operating system 914 using appropriate I/O devices, such as keyboard 911 or mouse (not shown), connected to I/O interface 904.

Computer 900 in this embodiment utilizes well-known virtual addressing mechanisms that allow its programs to behave as if they have access to a large, single storage entity instead of access to multiple, smaller storage entities such as main memory 902 and DASD device 910. Therefore, while operating system 914, instant messaging client 915, request push job and request pull job 916, 917 and their associated data reside in main memory 902, those skilled in the art will recognize that these items are not necessarily all completely contained in main memory 902 at the same time, and may also reside in the virtual memory of other computer systems (not shown) coupled to the computer system 400.

One suitable computer 900 is an eServer iSeries® computer running the OS/400® multitasking operating system both of which are produced by International Business Machines Corporation. Another suitable computer 900 is an IBM Thinkpad® computer running the Linux™ operating system. However, those skilled in the art will appreciate that the mechanisms and apparatus of the present invention apply equally to any computer system 900 and operating system 914, regardless of whether the computer system 900 is a complicated multi-user computing apparatus; a single-user workstation; a pervasive device, such as a cellular telephone or personal digital assistant ("PDA"); or an embedded control system.

Although the present invention has been described in detail with reference to certain examples thereof, it may be also embodied in other specific forms without departing from the essential sprit or attributes thereof. For example, those skilled in the art will appreciate that the present invention is capable of being distributed as a program product in a variety of forms, and applies equally regardless of the particular type of signal bearing media used to actually carry out the distribution. Examples of suitable signal bearing media include, but are not limited to: (i) information permanently stored on non-writable storage media (e.g. read-only memory devices within a computer such as CD-ROM disks readable by a CD-ROM drive; (ii) alterable information stored on writable storage media (e.g. floppy disks within a diskette drive, a CD-R disk, a CD-RW disk, or hard-disk drive); or (iii) information conveyed to a computer by a transmission medium, such as through a computer or telephone network, including wireless communications, and specifically includes information downloaded from the Internet and other networks. Such signal-bearing media, when carrying computer-readable instructions that direct the functions of the present invention, represent embodiments of the present invention.

Embodiments of the present invention may also be delivered as part of a service engagement with a client company, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

It will be appreciated that the previous description and the figures are for illustrative purposes only, and are not intended to limit the scope of the invention. In particular, various descriptions and illustrations of the applicability, use, and advantages of the invention are exemplary only, and do not define the scope of the invention. Accordingly, all questions of scope must be resolved only from claims set forth elsewhere in this disclosure.

What is claimed is:

1. A method of secure bidirectional cross system communication between one or more local computer systems and one or more remote computer systems comprising the steps of:

initiating a request push job on at least one of the one or more local computer systems for pushing a cross-system request from the one or more local computer systems to a request queue on the one of the one or more remote computer systems; and,     initiating a request pull job on at least one of the one or more local computer systems for pulling a cross-system request from the one or more remote computer systems to a request queue on the one or more local computer systems;

wherein the request push job further comprises:

initiating a connection with the one or more remote computer systems;

notifying the one or more remote computer systems that a local-to-remote communication will occur,         checking the first request queue for any cross-system requests destined for the one or more remote computer systems;

sending any cross-system requests destined for the one or more remote computer systems to the one or more remote computer systems; and,         processing the cross-system request at the one or more remote computer systems.

2. The method of claim 1 wherein the step of sending any cross-system requests to the one or more remote computer systems further comprises placing the cross-system request into the request queue on the one or more remote computer systems.

3. The method of claim 1 wherein the step of processing the cross-system request further comprises:

reading an application file on the remote computer system to determine which application queue the cross-system request will be routed to;

routing the cross-system request to an application queue using a request router job;

temporarily storing the cross-system request in the application queue until the cross-system request is processed by an application; and,     removing the cross-system request from the application queue and processing the cross-system request using the application.

4. The method of claim 1 wherein the request pull job further comprises:

initiating a connection with the one or more remote computer systems;

notifying the one or more remote computer systems a remote-to-local communication will occur;

checking the second request queue for any cross-system requests destined for the one or more local computer systems;

sending any cross-system requests destined for the one or more local computer systems to the one or more local computer systems; and,     processing the cross-system request at the one or more local computer systems.

5. The method of claim 4 wherein the step of processing the cross-system request once it has been sent from the one or more remote computer systems to the one or more local computer systems further comprises:

reading an application file on the local computer system to determine an application queue the cross-system request will be routed to;

routing the cross-system request to the application queue using a request router job;

temporarily storing the cross-system in the application queue request until the cross-system request is processed by an application; and,     removing the cross-system request from the application queue and processing the cross-system request using the application.

6. The method of claim 1 wherein the step of sending any cross-system requests to the one or more local computer systems further comprises placing the cross-system request into the request queue on the one or more local computer systems.

7. A method of enabling a local computer system for secure bidirectional cross system communication between the local computer system and a remote computer system comprising the steps of:

initiating a request push job on the local computer system for pushing a cross-system request from the local computer system and adapted to be received by a request queue on a remote computer system; and,     initiating a request pull job on a local computer system for pulling a cross-system request from a remote computer system and adapted to be received by a request queue on the local computer system;

wherein the request rush job further comprises:

initiating a connection with the remote computer system: notifying the remote computer system that a local-to-remote communication will occur,         checking the first request queue for any cross-system requests destined for the remote computer system: and         sending any cross-system requests destined for the remote computer system to the remote computer system.

8. The method of claim 7 wherein the step of sending any cross-system requests to the remote computer system further comprises placing the cross-system request into the request queue on the remote computer system.

9. The method of claim 7 wherein the request pull job further comprises:

initiating a connection with the remote computer system;

sending a notification to the remote computer system that a remote-to- local communication will occur;

checking the second request queue for any cross-system requests destined for the local computer system;

receiving any cross-system requests destined for the local computer system; and,     processing the cross-system request at the local computer system.

10. The method of claim 9 wherein the step of receiving any cross-system requests at the local computer system further comprises placing the cross-system request into the request queue on the local computer system.

11. The method of claim 9 wherein the step of processing the cross-system request once it has been received at a local computer system further comprises:

reading an application file on the local computer system to determine an application queue the cross-system request will be routed to;

routing the cross-system request to the application queue using a request router job;

temporarily storing the cross-system in the application queue request until the cross-system request is processed by an application; and, removing the cross-system request from the application queue and processing the cross-system request using the application.

* * * * *